United States Patent

Dickopp et al.

Patent Number: 5,978,516
Date of Patent: Nov. 2, 1999

[54] METHOD FOR CHECKING CONVERGENCE IN FRACTAL IMAGE CODING

[75] Inventors: Gerhard Dickopp, Krefeld; Peter Siepen, Oberhausen, both of Germany

[73] Assignee: Deutsche Thomson-Brandt GmbH, Villingen-Schwenningen, Germany

[21] Appl. No.: 08/938,090

[22] Filed: Sep. 26, 1997

[30] Foreign Application Priority Data

Oct. 7, 1996 [DE] Germany .......................... 196 41 157

[51] Int. Cl.$^6$ ............................. G06K 9/36; G06K 9/46
[52] U.S. Cl. .......................................................... 382/249
[58] Field of Search .............................. 341/51; 345/436; 348/384, 390, 403, 404, 420; 358/426, 430, 432, 433; 382/232, 248, 249, 276

[56] References Cited

FOREIGN PATENT DOCUMENTS

WO 95 08161 A1 3/1995 WIPO .

OTHER PUBLICATIONS

Saupe et al., "Complexity Reduction Methods for Fractal Image Compression", Sep. 1994, pp. 1–20, Image Processing: Mathematical and Applications.

Siepen et al., "The Question of Convergence in Fractal Image Coding", Oct. 1998, pp. 133–138, Proceedings of the 6th Dortmund Television Seminar.

Beaumont, "Advances in block based fractal coding of still pictures", pp. 3/1–3/6, IEE Colloquium.

Jacquin, "Image coding based on a fractal theory of iterated contractive image transformations", Jan. 1992, pp. 18–30, IEEE Transactions on Image Processing.

Fisher, "Fractal Image Conpression", 1994, pp. 11–14, 50–52, 59, 61, and 145–148.

Fischer, Yuval: Fractal Image Compression, Springer–Verlag, New York, Berlin, 1994, S.48–53, S. 214–228.

Jacquin, Arnaud E.: Fractal Image Coding: A Review In: Proceedings of the IEEE, vol. 81, No. 10, Oct. 1993, S. 1451–1465.

Jaggard, Dwight L.: Special Section on Fractals in Electrical Engineering. In: Proceedings of the IEE, vol. 81, No. 10, Oct. 1993, S. 1423–S1427.

Hurtgen, B.: Contractivity of fractaltransforms for image coding. In: Electronics Letters, 30. Sep. 1993, vol. 29, No. 20, S. 1749, 1750.

*Primary Examiner*—Amelia Au
*Assistant Examiner*—Timothy M. Johnson
*Attorney, Agent, or Firm*—Joseph S. Tripoli; Eric P. Herrmann; Alexander J. Burke

[57] ABSTRACT

A method is proposed for checking convergence in fractal image coding. In this case, a digitized image is divided into a number of range blocks ($R_i$, $R_{i+1}$) and into a number of domain blocks ($D_j$, $D_k$). A similar domain block is determined in relation to each range block. If necessary, in this process a transformation of a domain block is undertaken in order to map the domain block onto a range block. The assignment of the domain block to the range block including the transformation parameters represents the fractal code for the image. A reduced transformation matrix is set up to check convergence of the fractal code. The largest absolute eigenvalue of the transformation matrix is determined approximately. The entire method can be carried out in this case hierarchically. In a first approximation step, at least the row sum norm of each row of the reduced transformation matrix is checked. In further steps, further rows are combined to form square matrices of higher dimension. The latter are used to determine the largest absolute eigenvalues for the purpose of checking convergence.

11 Claims, 5 Drawing Sheets

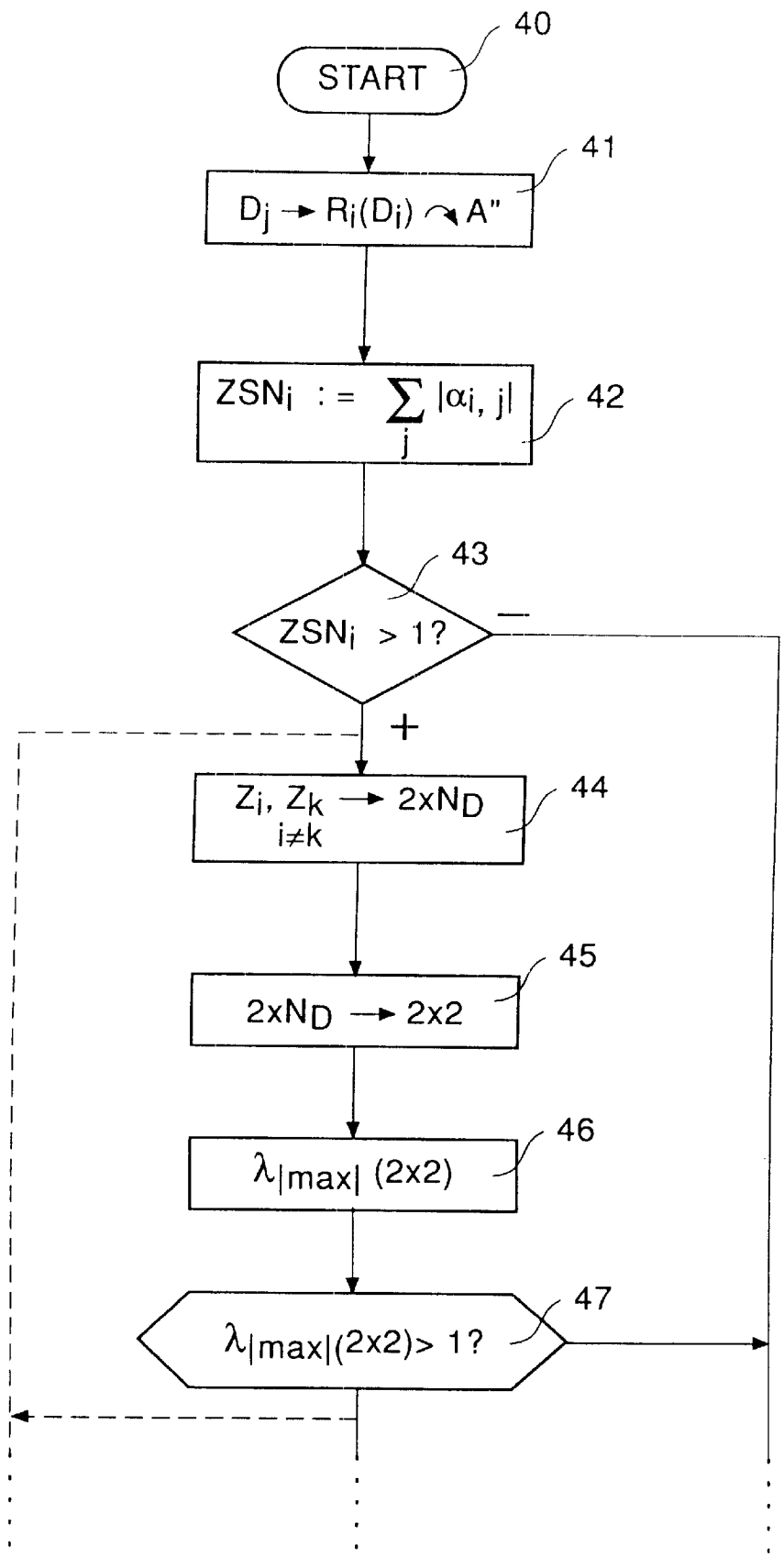

METHOD FOR CHECKING CONVERGENCE IN FRACTAL IMAGE CODING

BACKGROUND OF THE INVENTION

A. Field of the Invention

The invention relates to a method for checking convergence in fractal image coding.

B. Prior art

The invention proceeds from a method for checking convergence in fractal image coding according to the generic concept of the independent claim 1. A method for checking convergence in fractal image coding is already known from the article by P. Siepen and Prof. G. Dickopp "Zur Konvergenz bei der fraktalen Bildcodierung" ["On convergence in fractal image coding"], Proceedings of the 6th Dortmund Television Seminar, pages 133 to 138, October 1995. It is proposed there to reduce the dimension of the high-dimension transformation matrix using a proposed reduction method and to check the reduced transformation matrix for convergence instead of the original transformation matrix. It follows from the mathematics that checking the convergence of the transformation matrix or, in this case, of the reduced transformation matrix requires a determination of the eigenvalues of the matrix to be checked. Convergence occurs when all the eigenvalues of the matrix to be checked lie inside the unit circle of the complex plane. Calculating the eigenvalues of the reduced matrix still entails an immense outlay on computation, since the reduced matrix is still of very high dimension.

BRIEF SUMMARY OF THE INVENTION

It is the object of the invention further to simplify the method for checking convergence in fractal image coding such that it is possible to calculate the eigenvalues at least approximately with a substantially smaller outlay on computation.

The convergence checking method according to the invention has the advantage, as it were, of producing a hierarchical convergence checking method by means of which it is possible in a relatively simple way to estimate with a desired accuracy the largest absolute eigenvalues of the transformation matrix to be checked. In a first step, according to claim 1, the row sum norm of the reduced matrix is checked. This already produces a first statement as to which domain blocks or the range blocks contained therein are essentially responsible for an excessively large eigenvalue.

If it is desired to obtain a more precise statement on the magnitude of the largest eigenvalues, further measures, which permit a more precise estimation of the largest eigenvalues, are specified. However, in this case it has to be borne in mind that each additional measure increases the outlay on computation. The decision as to how accurately the largest eigenvalues are to be determined can be taken flexibly, depending on the computing power available and the application. Since in the case of the additional checking steps ever larger submatrices of the reduced transformation matrix are checked for their largest eigenvalues, in the end the locating of the range blocks chiefly responsible for the divergence becomes ever poorer. Consequently, it is advisable to calculate the largest eigenvalues only with a specific accuracy and, in the case of relatively large eigenvalues, to select a new assignment of domain blocks relative to range blocks and to adjust the transformation parameters for mapping domain blocks onto the relevant range blocks, and thus to achieve convergence of the transformation matrix.

BRIEF DESCRIPTION OF THE DRAWINGS

Exemplary embodiments of the invention are represented in the drawings and explained in more detail in the following description.

DETAILED DESCRIPTION OF THE INVENTION

The first step below is to explain in detail the mathematical theory which is the basis of the method according to the invention for checking convergence in fractal image coding. A good introduction to the theme of fractal image coding based is given in the article by A. E. Jacquin, "Image coding based on fractal theory of iterated contractive image transformations", IEEE Trans. on image processing Vol. 1, pages 18–30, January 1992.

Figure 2:
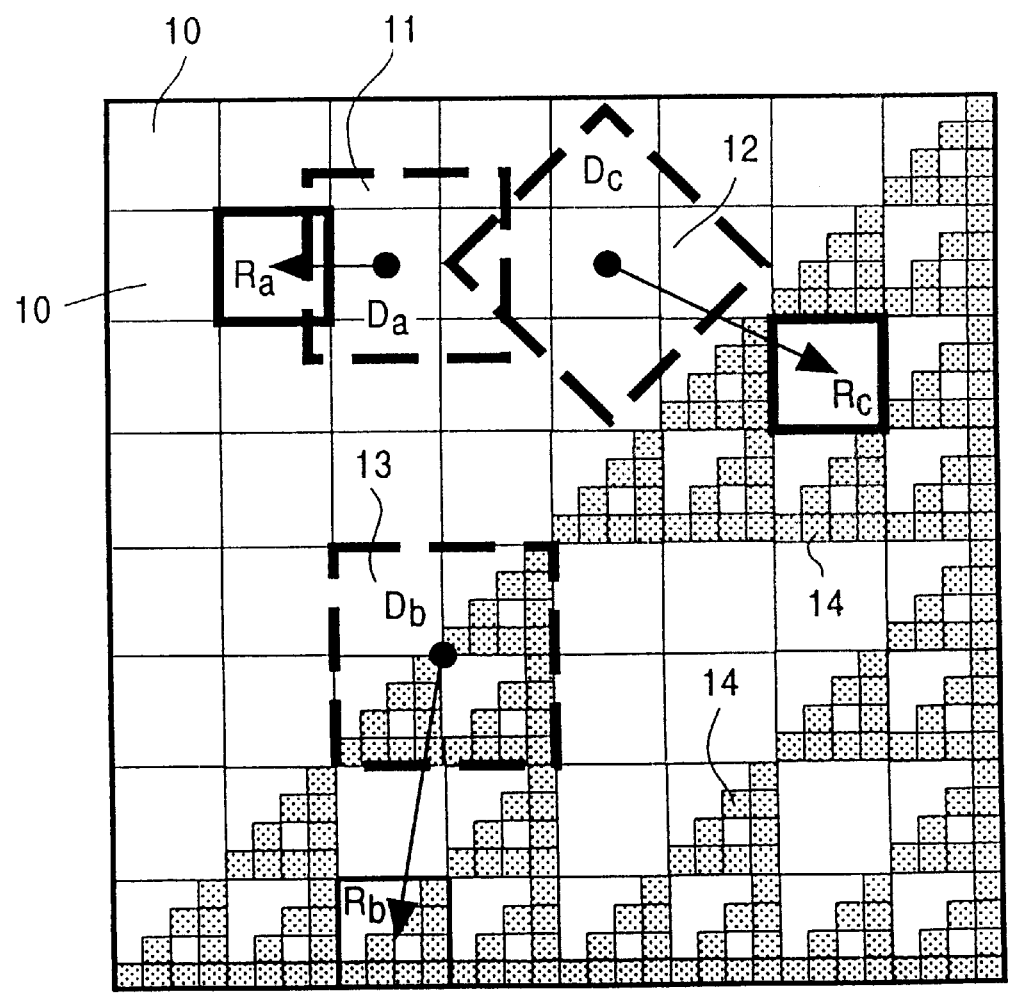
FIG. 2 shows a representation of an image, to be coded, with range blocks represented and some domain blocks.

In fractal image coding, an original image is divided into non-overlapping so-called range blocks. Furthermore, the image is divided into a number of larger domain blocks. In this process, it is permissible for the domain blocks to overlap mutually. The number of the pixels of the domain blocks is $N_S$ times larger than the number of pixels of the range blocks. FIG. 2 shows, by way of example, a square image with a division of the image into range blocks 10, as well as a few domain blocks 11, 12 and 13, which are represented by dashes. The pixels are provided with the reference numeral 14.

During the coding operation, the encoding device searches for suitable domain blocks $D_k$ for each range block $R_i$. If necessary, the suitable domain block is then transformed using the transformation $\tau_i$, with the result that the transformed domain block $D_k$ is the best possible approximation for the associated range block $R_i$:

$$\tau_i(D_k)=l_i[g_i(D_k)]=\hat{R}_i \approx R_i \qquad [1]$$

The transformation $\tau_i$ comprises a geometrical component $g_i$ and a luminance transformation component $l_i$. The geometrical transformation $g_i$ reduces the size of the domain block $D_k$ to the size of the range block $R_i$, and can additionally effect a geometrical manipulation of the type of a displacement. The luminance transformation $l_i$ leads to an affine transformation of the luminance values L of the domain block by means of:

$$L'=a \cdot L+b \qquad [2]$$

If each individual approximated range block $\hat{R}_i$ of the image can be represented by a transformation of a domain block, this is a transformation for the complete image to be coded. Consequently, a transformation W is defined which transforms the complete image into another image, $K_R$ specifying the number of the range blocks:

$$W = \bigcup_{i=1}^{K_R} \tau_i \qquad [3]$$

If W is a contractive transformation, a decoding device can construct a so-called fixed point, specifically entirely on the basis of the knowledge of the transformation W. The fixed point is virtually the decoded image. This is ensured on the basis of the Banach fixed point theorem. This theorem specifies that the sequence of iterations $\{x_k\}$ with $x_{k+1}=W(x_k)$ converges for all arbitrary initial images $x_0$ to a fixed point $x_f$ of W.

In general, it is possible to find only one transformation W which has a fixed point $x_f$ which is a good approximation of the original image x. However, for a prescribed approximation error d(x,W(x)), the so-called Collage theorem gives an upper limit for the reconstructed error d(x, $x_f$).

It is the task of the encoding device to find that transformation W which minimizes the approximation error as far as possible. If this found transformation W can be represented by fewer bits than the image itself to be coded, the goal of data compression is reached. Consequently, the transformation W is also designated as a fractal code. Because of the fact that a range block and its corresponding domain block are usually localized in different parts of the image, by contrast with DCT-based coding methods, in fractal coding the correlation between image parts remote from one another is used for redundancy reduction. This correlation between mutually remote image parts is also designated as self-similarity. The most important question concerning the transformation W is whether W is a contractive transformation or not. Use is made in many practical coding schemes of the contractivity criterion that the magnitude of all the transformation coefficients (parameters) $a_i$ on the individual transformations $\tau_i$ must fulfil the condition $a_i<1$. However, it has been shown that if values of $a_i>1$ are also permitted, the decoded image is of higher quality.

Figure 1:
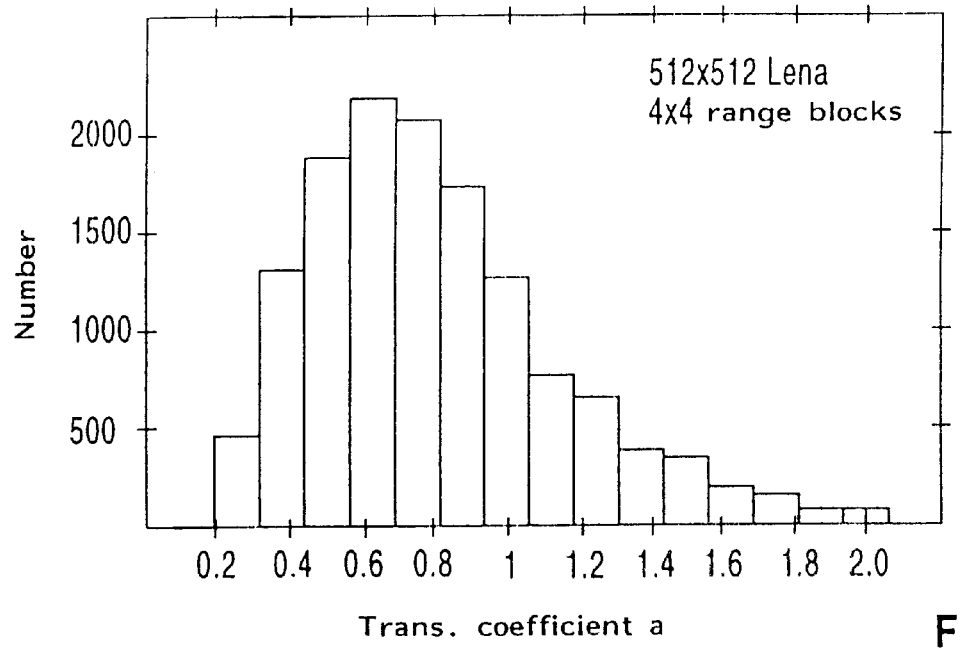
FIG. 1 shows the frequency distribution of the transformation coefficients a for a coded image.

If, for example, values in the interval from 0 to 2 are permitted for the transformation coefficients in the case of the luminance transformation, FIG. 1 shows a possible distribution of the coefficients $a_i$ for an ordinary exemplary image. It is clearly to be seen in this image that a large number of coefficients have values greater than 1. It therefore becomes clear that limiting the coefficients $a_i$ to values below 1 leads to a large number of non-optimum partial transformations $\tau_i$. However, the quality of the reconstructed image is thereby also worsened as a result. For this reason, transformations $\tau_i$ with coefficients $a_i>1$ should also be permitted as far as possible, in order to achieve a higher quality of the reconstructed image. If this is done, however, bolstered efforts must be made to ensure convergence of the transformation on the decoder side. A suitable convergence criterion is therefore sought by means of which the contractivity of the transformation W can be checked simply and quickly.

An image comprising R·C pixels is considered below as a vector in an N=RC-dimensional space:

$$x=(x_1, x_2, \ldots, x_M)^T \qquad [4]$$

Using the original image, represented by a vector, the transformation W can then be written as an affine transformation:

$$\hat{x}=W(x)=A\cdot x+b \qquad [5]$$

In the language of this equation, the matrix A can be regarded together with the vector b as another representation of the fractal code. If the sequence of the images $\{x_k\}$ expressed by the formula $$x_{k+1}=A\cdot x_k+b \qquad [6]$$

converges to a fixed point $x_f$, $x_f$ can be regarded as the decoded image.

A contractivity criterion for the matrix A is developed below.

A necessary and sufficient condition for equation [6] to converge is that all the eigenvalues $\lambda_i$ of A lie inside the unit circle of the complex plane:

$$|\lambda_i|<1 \forall i \in \{1, \ldots, N\} \qquad [7]$$

The calculation of the largest eigenvalues directly from this N×N matrix A is virtually impossible in a suitable time frame, since N represents the number of the pixels of the original image, and therefore the matrix is of enormous size, for example in the case of a television image according to the PAL Standard there would be a 720·576=414,720-dimensional matrix. The problem can be solved using the following two methods:

It is possible either to use general considerations to determine rules for the parameters (coefficients) of the affine transformation [2], or to reduce the matrix A to a smaller matrix in such a way that it continues to contain the largest absolute eigenvalue $\lambda_{max}$. In the case of the first method, many very strict limitations are imposed regarding the fractal coding scheme to be permitted. For example, this leads precisely to the limitation that the coefficients $a_i$ must fulfil the condition $a_i<1$. This can be derived from the fact that the norm $$\|A\| = \max_i \sum_{j=1}^{n} |a_{i,j}|$$

of the matrix A has an upper limit for its eigenvalues.

The next step is to go more precisely into the structures of matrix A. In order to arrive at the desired reduction method, the structure of the matrix A must be explained in more detail. In this case, it is also necessary to impose some restrictions for the basic fractal coding scheme. However, these restrictions are less restrictive than those which would be necessary for the method mentioned first. For example, the reduction method which is explained here can also be used in the case of fractal coding schemes which also permit overlapping of the domain blocks.

The $K_S$ different and linearly independent vectors $s_i$ describe the mapping of $N_S$ different pixels of a domain block onto a pixel of a range block:

$$s_i = (\ \underbrace{0, \ldots, 0}_{(i-1)\cdot N_S-\text{times}},\ \underbrace{1, \ldots, 1}_{N_S-\text{times}},\ \underbrace{0, \ldots, 0}_{(K_S-i)\cdot N_S-\text{times}}\ )^T \qquad [8]$$

with $K_S = N/N_S$

The $s_i$ are designated as scaling blocks, and the row vectors of A comprise these vectors $s_i$ multiplied by a factor. The $K_R$ different and linearly independent vectors $r_i$ describe the range blocks comprising $N_R$ pixels:

$$r_i = (\ \underbrace{0, \ldots, 0}_{(i-1)\cdot N_R-\text{timeR}},\ \underbrace{1, \ldots, 1}_{N_R-\text{timeR}},\ \underbrace{0, \ldots, 0}_{(K_R-i)\cdot N_R-\text{timeR}}\ )^T \qquad [9]$$

-continued with $K_R = N/N_R$ $$r_i = \sum_{j=(i-1)\cdot M_R+1}^{i\cdot M_R} s_j \quad \text{with} \quad N_R = N_S^{m_R-1}, \quad M_R = \frac{N_R}{N_S}$$

and $m_R \in \{1, 2, \ldots\}$

The vectors $r_i$ can therefore be described as the sum of $M_R$ different vectors $s_j$, $M_R$ specifying the number of the scaling blocks per range block. The $K_D$ different and linearly independent vectors $d_i$ describe the domain blocks comprising $N_D$ pixels. In turn, the domain blocks can be described as a sum of $N_S$ range blocks:

$$d_k = \sum_{j=1}^{N_S} x_j \quad \text{with} \quad x_j \in \{r_1, \ldots, r_{K_R}\} \text{ and} \qquad [10]$$

$x_i \neq x_j$ for $i \neq j$

If this is taken into account, the matrix A can be expressed as a combination of $K_R$ different $N_R \times N$ submatrices $R_i$. Each of these matrices $R_i$ describes the mapping of a domain block onto a range block.

$$A = (a_1 \cdot R_1^T, \ldots, a_i \cdot R_i^T, \ldots, a_{K_R} \cdot R_{K_R}^T)^T \text{ with } R_i \in \{D_1, \ldots, D_{K_D}\}\}$$

The $K_D$ different matrices $D_i$ comprise $N_R$ different vectors $s_j$. The sum of these vectors produces a vector $d_i$. Thus all the scaling blocks of a domain block together produce a domain block:

$$D_k = (x_{k,i}, \ldots, x_{k,j}, \ldots, x_{b,N_R})^T \text{ with} \qquad [12]$$

$x_{k,j} \in \{s_1, \ldots, s_{K_S}\}, x_{k,i} \neq x_{k,j}$ for $i \neq j$ and $$\sum_{j=1}^{N_R} x_{k,j} = d_k$$

The $x_{k,j}$ from the equation [12] must fulfil the following conditions if a fractal coding scheme with $m_R \geq 2$ is considered:

$$\sum_{j=p\cdot L+1}^{(p+1)L} x_{k,j} = \sum_{j=q\cdot L+1}^{(q+1)L} s_j \qquad [13]$$

$\forall p,$ $$q \in \left\{0, \ldots, \frac{N_R}{L} - 1\right\} \wedge L \in \{N_S^{m-1} | m = 2, \ldots, m_R\}$$

This formula limits the arrangement of the scaling blocks inside a domain block.

The structure of the matrix A leads to some restrictions concerning the selection of range blocks and domain blocks. It is required on the basis of equation [9] that only range blocks of constant size are permitted. It follows from equations [10] and [11] that overlapping domain blocks are permitted, although with the restriction that the overlapping regions of 2 neighbouring blocks must in each case be n times the size of a range block, where n ∈ of the natural numbers. The geometrical transformations (isometries) in equation [1] are limited by equation [13].

The matrix A described above has a large number of eigenvalues $\lambda_1 = 0$ and only a small number of eigenvalues where $\lambda_i \neq 0$. It is therefore sensible to develop a reduction method which reduces the dimension of the matrix A without changing the eigenvalues $\lambda_i \neq 0$. Such a reduction method is explained below in more detail.

Firstly, a general reduction method is developed. Consequently, the first step is to proceed from an N×N matrix C. If the similarity transformation $$C' = T \cdot C \cdot T^{-1} \qquad [14]$$

is applied with a non-singular matrix T to the matrix C, the resulting matrix C' has the same characteristic polynomial as the matrix C. Consequently, the eigenvalues of C and C' are also, however, identical. This property of a similarity transformation can be utilized in order to reduce the dimension of the matrix without the eigenvalues $\lambda_i \neq 0$ being influenced. The transformation matrix T comprises N linearly independent row vectors $t_i$:

$$T = (t_1, \ldots, t_i, \ldots t_N)^T \text{ with } t_i = (t_{i,1}, \ldots, t_{i,j}, \ldots, t_{i,N})^T \qquad [15]$$

Alternatively, the matrix T comprises N linearly independent column vectors $u_i$:

$$T = (u_1, \ldots, u_j, \ldots u_N)^T \text{ with } u_j = (t_{1,j}, \ldots, t_{i,j}, \ldots, t_{N,j})^T \qquad [16]$$

T is a non-singular matrix, and the inverse matrix $T^{-1}$ exists, with:

$$TT^{-1} = I = \begin{pmatrix} 1 & & 0 \\ & \ddots & \\ 0 & & 1 \end{pmatrix} \qquad [17]$$

If, now, the N×N matrix C of the special form:

$$C = (c_1 \cdot t_{k(1)}, \ldots, c_i \cdot t_{k(i)}, \ldots, c_N \cdot t_{k(N)})^T \qquad [18]$$

with $k(i) \in \{1, \ldots M\}$ and $M < N$ is considered, $k(i)$ specifying the index of the row vector of the transformation matrix T, the product of the matrices C and $T^{-1}$ can be written as:

$$C \cdot T^{-1} = (y_1, \ldots, y_i, \ldots, y_N) \qquad [19]$$

It is to be borne in mind that only the first M row vectors of the matrix T are used. The following is obtained for the $y_i$ from equation [17]:

$$y_i = (y_{1,i}, \ldots, y_{2,i}, \ldots, y_{N,i})^T \text{ with } y_{j,i} = \begin{cases} 0 & \text{for } i \neq k(j) \\ c_j & \text{for } i = k(j) \end{cases} \qquad [20]$$

Thus, as a result of the similarity transformation according to equation [14], it is obtained for the matrix C' that it can be written in terms of its column vectors:

$$C' = T \cdot C \cdot T^{-1} = (c'_1, \ldots, c'_j, \ldots, c'_N) \text{ with } c'_j = (c'_{1,j}, \ldots, c'_{i,j}, \ldots, c'_{N,j})^T \qquad [21]$$

It follows from equations [18] and [20] that:

$$c'_j = 0 \text{ with } j > M \qquad [22]$$

The result for the column vectors $c'_j$ of C' with $j \leq M$ is:

$$c'_j = \Sigma c_i \cdot u_i \forall i \text{ with } k(i) = j; i = 1, \ldots, N \qquad [23]$$

C' can therefore be written in the following form:

$$C' = \begin{pmatrix} C'_{red} & 0 \\ C'' & 0 \end{pmatrix} \quad [24]$$

And the characteristic polynomial of C' is yielded as $$\det(C-\lambda \cdot I) = \det(C'_{red}-\lambda \cdot I) \cdot \lambda^{N-M} = 0 \quad [25]$$

It is therefore evident that the reduced M×M matrix $C'_{red}$ has all the eigenvalues $\lambda_i \neq 0$ as the original matrix C.

The general reduction scheme is applied in the following section to the matrix $A_0=A$ from equation [10]. $A_0$ comprises N row vectors:

$$A_0 = (k_1 \cdot e_1, \ldots, k_i \cdot e_i, \ldots, k_N \cdot e_N)^T \quad [26]$$

with $k_i \in \{a_1, \ldots, a_{K_R}\}$ and $e_i \in \{s_1, \ldots, s_{K_S}\}$

The corresponding transformation matrix T is selected such that the first $K_S$ rows comprise the different linearly independent vectors $s_i$. The remaining $N-K_S$ rows of T are arbitrary row vectors $w_i$, which ensure that the resulting transformation matrix is a non-singular matrix:

$$T = (s_1, \ldots, s_{K_S}, w_1, \ldots, w_{N-K_S})^T \quad [27]$$

If the above-described general reduction scheme is applied, the result is a $K_S \times K_S$ matrix $A_1$:

$$A_1 = (\alpha_{i,j}) \text{ with } i,j \in \{1, \ldots, K_S\} \quad [28]$$

The elements $\alpha_{i,j}$ have the following structure:

$$\alpha_{i,j} = \begin{cases} \alpha & \text{for } k_l e_l = \alpha \cdot s_j \text{ with } l = (i-1)N_S + 1, \ldots, i \cdot N_S \\ 0 & \text{otherwise} \end{cases} \quad [29]$$

The matrix $A_1$, resulting from the general reduction scheme, can, when applied to the matrix $A_0$, be interpreted as the linear part of the affine transformation according to equation [5] with an image undersampled by the factor $N_S$. If the general reduction scheme is applied ($m_R = \log_{NS} N_R$) times to the matrix $A_0$, the $K_R \times K_R$ matrix $A' = A_{mg}$ is obtained as a result of the first reduction step.

The second reduction step is described below.

The matrix A', obtained after the first reduction step, has a simpler structure by comparison with the original matrix $A_0$. It is also possible to specify for this reduced matrix vectors which describe the range blocks and domain blocks. The $K_R$ different linearly independent $r_i$ have the following form:

$$r_i = (\underbrace{0, \ldots, 0}_{(i-1)-\text{times}}, \underbrace{0, \ldots, 0}_{(K_R-i)-\text{times}})^T; i = 1, \ldots, K_R \quad [30]$$

The $K_D$ different linearly independent $d_i$ can be written as the sum of $N_S$ different $r_i$:

$$d_i = \sum_{j=1}^{N_S} x_j \text{ with } x_j \in (r_i, \ldots, r_{K_R}) \text{ and} \quad [31]$$

$$x_j \neq x_i \text{ for } i \neq j$$

$$d_i = (d_{i,1}, \ldots, d_{i,K_b})^T$$

The matrix A' can therefore be written as:

$$A' = (a_1 f_1, \ldots, a_i f_i, \ldots, a_{K_R} f_{K_R})^T \text{ with } f_i \in \{d_1, \ldots, d_{K_D}\} \quad [32]$$

The transformation matrix T', which is used in the general reduction scheme, comprises the linearly independent vectors $d_i$ and some vectors $w_i$. The vectors $w_i$ are arbitrary vectors. The sole condition which the vectors $w_i$ must fulfil is that the resulting matrix T' is not singular.

$$T' = (d_1, \ldots, d_{K_D}, w_1, \ldots, w_{K_R-K_D})^T \quad [33]$$

The use of the general reduction scheme leads to the $K_D \times K_D$ matrix A":

$$A'' = (\alpha_{i,j}) \text{ with } i,j=1, \ldots, K_D \quad [34]$$

with the following elements $$\alpha_{i,j} = \Sigma \alpha_k \forall k \text{ with } (f_k = d_j \wedge d_{i,k} \neq 0) \quad [35]$$

Consequently, the reduction scheme presented here of the original N×N matrix A leads to the reduced $N_D \times N_D$ matrix A", which likewise has all eigenvalues $\lambda_i \neq 0$ of the matrix A, N being the number of the pixels of the original image, and $N_D$ specifying the number of the domain blocks.

Viewed after the event with the results of the preceding sections, a way suggests itself for checking the convergence of the original matrix A, in which first the original matrix A is set up and then the previously described reduction scheme is applied in order to obtain the reduced matrix A". However, because of the large dimension of the original matrix A, determining the eigenvalues of the reduced matrix can nevertheless still require a very high outlay on computation.

Closer entries of the resulting matrix A" reveal that this matrix can be set up without firstly having to set up the original matrix. The following rules can be applied in order to set up the reduced matrix A":

The dimension of the reduced matrix A" is equal to the number of the domain blocks $N_D$ of the fractal coding scheme.

The entries $\alpha_{i,j}$ of the reduced matrix A" comprise the sum of the factors $a_k$, which describe the mapping of the jth domain block onto range blocks which lie inside the ith domain block.

These rules deliver a simpler scheme for generating the resulting matrix A". Because of the drastically reduced dimension of the reduced matrix, it is naturally much simpler to evaluate the reduced matrix than the original matrix A. Since the reduced matrix A" likewise has all eigenvalues $\lambda_i \neq 0$ of the original matrix A, the reduced matrix A" can be used instead of the original matrix A in order to check the contractivity.

Although a drastic reduction in the outlay on computation is achieved for convergence checking, it is still possible that a higher outlay is required for the eigenvalue calculation of the reduced matrix A". A further disadvantage in that the calculation of the largest eigenvalues delivers only information on whether the fractal coding scheme is convergent or not. However, no information is obtained on which range block causes the convergence problem.

A hierarchical convergence checking method is presented below for the purpose of overcoming these disadvantages. It is then possible using this scheme to undertake a simple check of the largest eigenvalues which specifies an upper limit for the largest eigenvalues. This upper limit can be calculated more accurately step by step. However, it has to be considered that each additional step renders an increased outlay on computation necessary. In addition, however, the information is obtained by means of which those range blocks which cause the convergence problem can be localized.

The method is explained in more detail below. In this section, an n×n matrix A is considered which already represents a reduced matrix.

$$A = \begin{pmatrix} a_{1,1} & a_{1,2} & \cdots & a_{1,n} \\ a_{2,1} & a_{2,2} & \cdots & a_{2,n} \\ \vdots & \vdots & \ddots & \cdots \\ a_{n,1} & a_{n,2} & \cdots & a_{n,n} \end{pmatrix} \quad [36]$$

According to the Gershgorin theorem, there exist n discs in the complex plane, each of them being centred about a diagonal element $a_{i,i}$ of A, and having the following radius:

$$r_i = \sum_{j=1, j\neq i}^{n} |a_{i,j}| \quad [37]$$

The theorem specifies that all the eigenvalues of the matrix A lie inside the union set of these n discs.

If the matrix A is modified in the following manner, the modified matrix $\overline{A}$ is obtained $$\tilde{A} = \begin{pmatrix} \tilde{a}_{1,1} & \cdots & a_{1,m} & 0 & \cdots & 0 \\ \cdots & \ddots & \vdots & \vdots & \ddots & \cdots \\ a_{m,1} & \cdots & \tilde{a}_{m,m} & 0 & \cdots & 0 \\ 0 & \cdots & 0 & \tilde{a}_{m+1,m+1} & \cdots & a_{m+1,n} \\ \vdots & \ddots & \vdots & \vdots & \ddots & \vdots \\ 0 & \cdots & 0 & a_{n,m+1} & \cdots & \tilde{a}_{n,n} \end{pmatrix} \quad [38]$$

with $$\tilde{a}_{k,k} = \begin{cases} a_{k,k} + \sum_{i=m+1}^{n} |a_{k,i}| & \text{for } a_{k,k} \geq 0 \\ a_{k,k} - \sum_{i=m+1}^{n} |a_{k,i}| & \text{for } a_{k,k} < 0 \end{cases} \quad [39]$$

for $k \in \{1, \ldots, m\}$ and $$\tilde{a}_{k,k} = \begin{cases} a_{k,k} + \sum_{i=1}^{m} |a_{k,i}| & \text{for } a_{k,k} \geq 0 \\ a_{k,k} - \sum_{i=1}^{m} |a_{k,i}| & \text{for } a_{k,k} < 0 \end{cases} \quad [40]$$

for $k \in \{m+1, \ldots, n\}$

The fractal coding scheme is split into two separate parts by this modification. These parts are the domain blocks 1, . . . , m and the domain blocks m+1, . . . , n. Owing to this operation, the centre points of the Gershgorin discs move into the outer regions of the complex plane, and their radii shrink. Together with $$\sum_{i=1}^{n} a_{i,i} = \sum_{i=1}^{n} \lambda_1 \text{ and } \sum_{i=1}^{n} \tilde{a}_{i,i} = \sum_{i=1}^{n} \tilde{\lambda}_i \quad [41]$$

it is plausible that the eigenvalues of the matrix $\overline{A}$ are more critical than that of the matrix A.

The eigenvalues of the two submatrices $$B_1 = \begin{pmatrix} \tilde{a}_{1,1} & \cdots & a_{1,m} \\ \vdots & \ddots & \vdots \\ a_{m,i} & \cdots & \tilde{a}_{m,m} \end{pmatrix} \quad [42]$$

and $$B_2 = \begin{pmatrix} \tilde{a}_{m+1,m+1} & \cdots & a_{m+1,n} \\ \vdots & \ddots & \vdots \\ a_{n,m+1} & \cdots & \tilde{a}_{n,n} \end{pmatrix} \quad [43]$$

can be calculated independently of one another.

Because the eigenvalues of a matrix are not changed when two rows k and l are interchanged with the $$\binom{n}{m}$$

columns k and l, it is possible to set up different matrices $B_1$. When all eigenvalues of these different matrices $B_1$ fulfil the contractivity criterion, then the complete matrix A likewise fulfils this criterion.

If m is small, checking the contractivity criterion is carried out only roughly, and the estimation for the largest eigenvalues specifies a rough upper limit. The larger the value m, the better the estimation for the largest eigenvalues. The outlay on computation rises, of course, the larger the value m becomes. With m=1, the convergence criterion corresponds to the row norm of the matrix A:

$$\|A\| = \max_i \sum_{j=1}^{n} |a_{i,j}| \quad [44]$$

The results of the above sections can be used to specify the following hierarchical convergence checking scheme:

Firstly, the row norm (m=1) is checked. This is achieved by summing up all the contrast factors a of all range blocks which lie inside a domain block. This is equivalent to the row sum of the matrix A. If this sum is smaller than $N_S$, the convergence criterion for this domain block is automatically fulfilled. This must be checked for each domain block. If the convergence criterion for a domain block is not fulfilled, either the transformation coefficients of the range blocks which lie inside the domain block can be adjusted, or continuation is by means of a cond step, which will be explained below.

Each (m−1)×(m−1) matrix $B_1$ which does not fulfill the convergence criterion is then combined with each row of the remaining n−m+1 rows of the matrix A. In this way, n−m+1 different matrices $B'_1$ of dimension m are obtained. It is then necessary for all these matrices to be checked separately. If some of these matrices likewise do not fulfil the convergence criterion, either the transformation coefficients are adapted, or the next largest matrices are set up with this matrix and a check is made as to whether these matrices fulfil the criterion. Since the outlay on computation rises quickly with each additional dimension of the matrix to be checked, it is sensible to use a scheme in which starting from a specific dimensional value m an adjustment is undertaken of the transformation coefficients of all the range blocks which lie inside the critical domain block. The person using the scheme which is presented here can decide flexibly how much he wishes to spend in terms of computational outlay for convergence checking.

Figure 3:
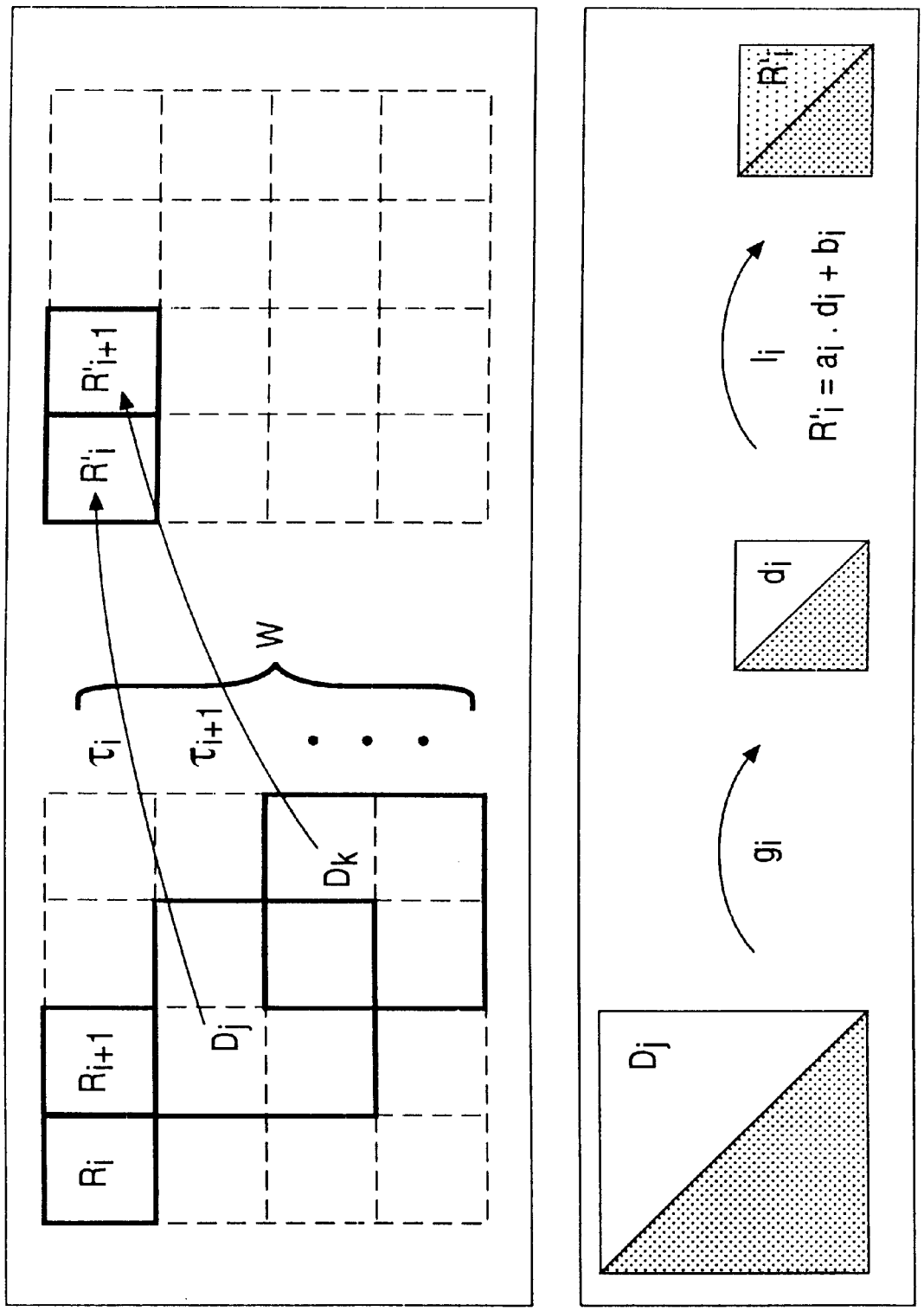
FIG. 3 shows an advantageous division of an image, to be coded, into range blocks and associated domain blocks.
Figure 4:
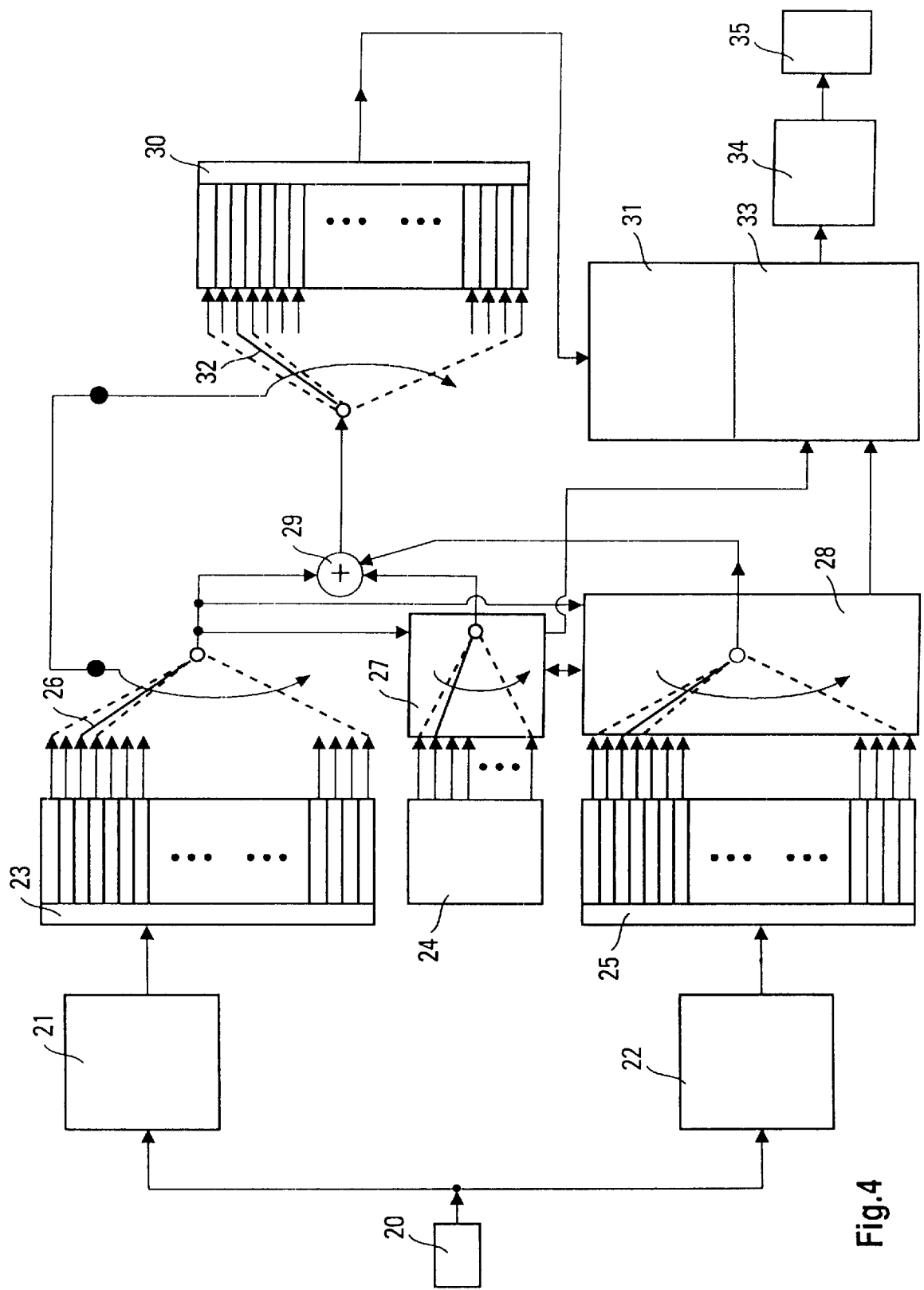
FIG. 4 shows a rough block diagram for a coding device for fractal image coding.

The convergence checking method is explained in more detail below with the aid of FIGS. 3 to 5. Represented in the upper part of FIG. 3 is the division of an original image to be coded into range blocks $R_i$, $R_i+1$, . . . . Only a small image has been adopted as an example; it has a square format and is divided into 16 range blocks. Also represented in FIG. 3 are two domain blocks $D_j$ and $D_k$. It is clearly to be seen that both domain blocks $D_j$ and $D_k$ mutually overlap. The division of the image into domain blocks is linked in this case to the condition that, firstly, the domain blocks must be four times the size of range blocks and, secondly, that the position of the domain blocks may always be chosen only such that a domain block contains four complete range blocks. Given these restrictions, seven domain blocks can be set up in the image represented in FIG. 3. In FIG. 3, the reconstructed image is represented on the right-hand side of the image. The reconstructed image is likewise divided again into range blocks $R'_1$, $R'_{i+1}$. It is indicated by arrows that the domain block $D_j$ maps the range block $R'_1$, and that the domain block $D_k$ maps the range block $R'_{i+1}$. Represented diagrammatically in the lower part of FIG. 3 is the transformation of a domain block $D_j$. In a first step, indicated by the first transition arrow, the size of the domain block is reduced to the size of a range block. This requires the geometrical transformation $g_i$. Four pixels of the domain block $D_j$ are assigned a pixel of the reduced domain block $d_i$. It is possible in this case, for example, for the luminance values of the pixels to be reported. In the second step, the luminance values of the reduced domain block are transformed. The associated transformation formula is represented below the second transition arrow. The numbers $a_i$ represent the contrast factor by which all the luminance values in the reduced domain block are multiplied. The number $b_i$ specifies the number which is added to each luminance value inside the reduced domain block $d_i$. For example this is the new range block $R'_i$.

The design of a coding device for fractal image coding is explained in more detail below with the aid of FIG. 4. A storage unit for an original image is denoted by the reference numeral 20. The reference numeral 21 denotes a processing unit which divides the original image into suitable range blocks. It can be stipulated here, for example, that each range block has a size of, for example, 4×4 pixels. The reference numeral 22 denotes a processing unit which divides the original image into a number of domain blocks. Here, for example, it can be stipulated that each domain block must be four times the size of each range block, that is to say a domain block comprises 8×8 pixels. The division of the image into domain blocks is not completely free, but is linked to the boundary conditions, as explained in the case of the preceding image 3.

The reference numeral 23 denotes a range block table. Stored in this table are the associated pixel values relating to a range block, as well as the information as to which position the range block has inside the original image. However, this can be prescribed implicitly by the position of the respective range block inside the table.

Consequently, the reference numeral 25 denotes a domain block table. The pixel values of the respective domain blocks are stored in order therein in an appropriate way.

A table with transformation operations is denoted by the reference numeral 24. In order to simulate a range block as well as possible by means of a domain block, the domain block can be subjected to specific variation. These include rotations, reflections, multiplications of the luminances (or luminance signal values of the pixels by a factor a (contrast factor), as well as the displacement of the luminances (or luminance signal values of the pixels by a value b). These transformation operations are stored in Table 24.

The reference numeral 26 denotes a selection unit which can select a range block inside the range block table.

The reference numeral 27 denotes a selection and transformation unit.

The reference numeral 28 denotes a further selection and transformation unit for the domain block table. The prescribed selection of a range block by the selection unit 26 makes available the luminance values of the associated pixels and the selection and transformation unit 27 as well as the selection and transformation unit 28. The selection and transformation unit 28 uses the range block made available for the purpose of searching for a similar domain block from its domain block table 25. In the process, each domain block in domain block table 25 is successively reduced to range block size, and then the luminance values produced are compared with those of the selected range block. If, in this way, a suitable domain block has already been found which gives a very good simulation of the luminance values of the selected range block inside permitted tolerances, this domain block is fixed as associated domain block relating to the selected range block. In this case there is no need for further transformation for the domain block to be carried out in order to map the selected range block. This is then reported via the connection between the selection and transformation unit 27 and the selection and transformation unit 28. Frequently, however, it is not possible in this way to find a suitable domain block. In this case, the domain blocks in question require a further transformation to be carried out. This includes the above-mentioned rotations, reflections, multiplications of the luminances, and the displacement of the luminances. The selection and transformation unit 27 undertakes to carry out this transformation. The associated luminance values of the selected and reduced domain block are made available in this case to the selection and transformation unit 27 via the connection from the selection and transformation unit 28. In terms of principle, the search for a suitable domain block relating to a range block is already known from the prior art. A good overview of the search methods available is to be found in the literature reference: Dietmar Saupe, Raouf Hamzaoui; Complexity reduction method for fractal image compression; E.M.A. Conference proceedings on image processing; Mathematical methods and applications, September 1994, editor J. M. Blockledge, Oxford University Press 1995.

At the output of the selection and transformation unit 27, the information relating to the required transformation operations is then delivered to the summation point 29. The selection and reduction unit 28 delivers the information on which domain block belongs to the selected range block. Which range block has been selected is likewise transmitted to the summation point 29 by the selection unit 26. All this information is transmitted into the transformation table 30. In the process of, the selection unit 32 prescribes the place in the table where the information is stored. The information stored in the transformation table 30 represents a preliminary fractal code. The preliminary fractal code obtained is checked for convergence in the convergence checking unit 31. The mode of operation of the convergence checking unit 31 is further explained below with the aid of FIG. 5. The reference numeral 33 denotes an adjusting unit. The convergence checking unit 31 determines the information as to which range blocks effect the convergence problems of the preliminary fractal code. The adjusting unit 33 then ensures that the associated transformation parameters for these range blocks are changed so that the convergence criterion is fulfilled. The fractal code thus obtained is coded for entropy in the coding unit 34. The result is the finished fractal code which is stored in the storage unit 35. This can then, for example, be emitted via a transmitting station, and then decoded in turn by a receiving station.

The mode of operation of the convergence checking unit 31 will now be explained in more detail with the aid of the flowchart in FIG. 5. The reference numeral 40 denotes the programme start. The information obtained with regard to the range/domain block assignment and to the associated transformation coefficients is used in programme step 41 to set up the reduced matrix A". This is performed in accordance with the already specified rule that for an entry in the reduced matrix $\alpha_{i,j}$ the sum is calculated of the factors $a_k$ which describe the mapping of the "jth" domain block onto range blocks, which lie inside the ith domain block. The factors $a_k$ very frequently have the value of zero, since in each case only a single associated domain block has been determined in relation to a range block. In the next programme step 42, the row sum norm $ZSN_i$ is calculated for each row of the reduced matrix A". These row sum norms thus obtained are then checked in programme step 43 as to whether they have a value greater than 1. If this is not the case for any of the row sum norms, the fractal code obtained is convergent, and the programme is terminated in programme step 53. The procedure then continues with programme step 44 for those rows in the case of which the row sum norms have been detected as greater than 1. In this programme step, the relevant row is combined in each case with all the remaining rows to form a $2 \times N_D$ matrix. The result is then $N_D-1$ different $2 \times N_D$ matrices. A 2×2 matrix is then set up for each of these matrices in programme step 45. This is done as follows:

Once the $2 \times N_D$ matrix has been produced from the rows k and l of the reduced matrix, a 2×2 matrix is formed from the $2 \times N_D$ matrix by retaining only the columns k and l. The sum of the absolute values of all the elements, thus lost, of a row are then added to the main diagonal of the 2×2 matrix associated with this row if this main diagonal element is greater than or equal to zero, or are subtracted from this main diagonal element if the main diagonal element is smaller than zero. All the elements of the $2 \times N_D$ matrix are taken into account as a result. The largest absolute eigenvalue $\lambda_{|max|}$ is then determined in programme step 46 from the 2×2 matrix thus produced, for example using the von Mises method known from mathematics. A check is then made in programme step 47 as to whether the absolute value of the largest absolute eigenvalue is greater than 1. If this is not the case, this 2×2 matrix is not considered further. If the absolute value of this eigenvalue is larger than 1, a $3 \times N_D$ matrix is set up in programme step 48 based on the $2 \times N_D$ matrix. In this case, the relevant two rows from which the 2×2 matrix considered has been produced are combined with each of the remaining $N_D-2$ rows. This results in the $N_D-2$ different $3 \times N_D$ matrices. Each of these matrices is converted with the aid of the following method into a 3×3 matrix:
This is performed as follows:
For the participating 3 rows of the matrix, the assigned columns of the $3 \times N_D$ matrix are taken over into the new matrix. The sum of the absolute values of the column elements, not taken over, of a row are added to the main diagonal element of the corresponding row if the said element is larger than or equal to zero, or subtracted if it is smaller than zero. The largest absolute eigenvalue $\lambda_{|max|}$ is now determined in programme step 50 from each of these 3×3 matrices. If, in this case, the absolute value is then smaller than 1, the relevant matrix must no longer be considered; in this case the programme would be terminated in turn in programme step 53. Checking the largest absolute eigenvalue is performed in programme step 51. In the case in which the absolute value of the largest eigenvalue is larger than 1, an adaptation of the transformation parameters $a_k$ is carried out in this exemplary embodiment in programme step 52. In the case of the 3×3 matrix, 3 domain blocks corresponding to 12 range blocks, participate, with the result that the associated transformation parameters must be adjusted. This can be performed, for example, by multiplying all the participating parameters $a_k$ jointly by a factor k<1, with the result that the corresponding eigenvalue criterion is fulfilled. It is then necessary to redetermine in each case the associated factor b for the participating range blocks, but this has no influence on the convergence of the fractal code. This concrete possibility occurs whenever the corresponding criterion differs only slightly from the value 1.

As an alternative to this possibility, completely new domain blocks and new transformation rules can be determined in programme step 52 for the participating range blocks. Suitable boundary conditions can additionally be placed on these transformation rules. These boundary conditions are structured in such a way that the resulting transformations are less critical in terms of convergence than the transformations originally selected. For example, a criterion suitable for this is that the contrast factors $a_k$ are selected to be smaller than 1. After the adjustment of the transformation parameters, the programme is likewise terminated in programme step 53. The programme is then started a new, and the convergence of the adjusted fractal code is newly checked once more. The convergence checking is terminated when the checking of all the criteria to be investigated has produced a value smaller than 1.

Figure 5:
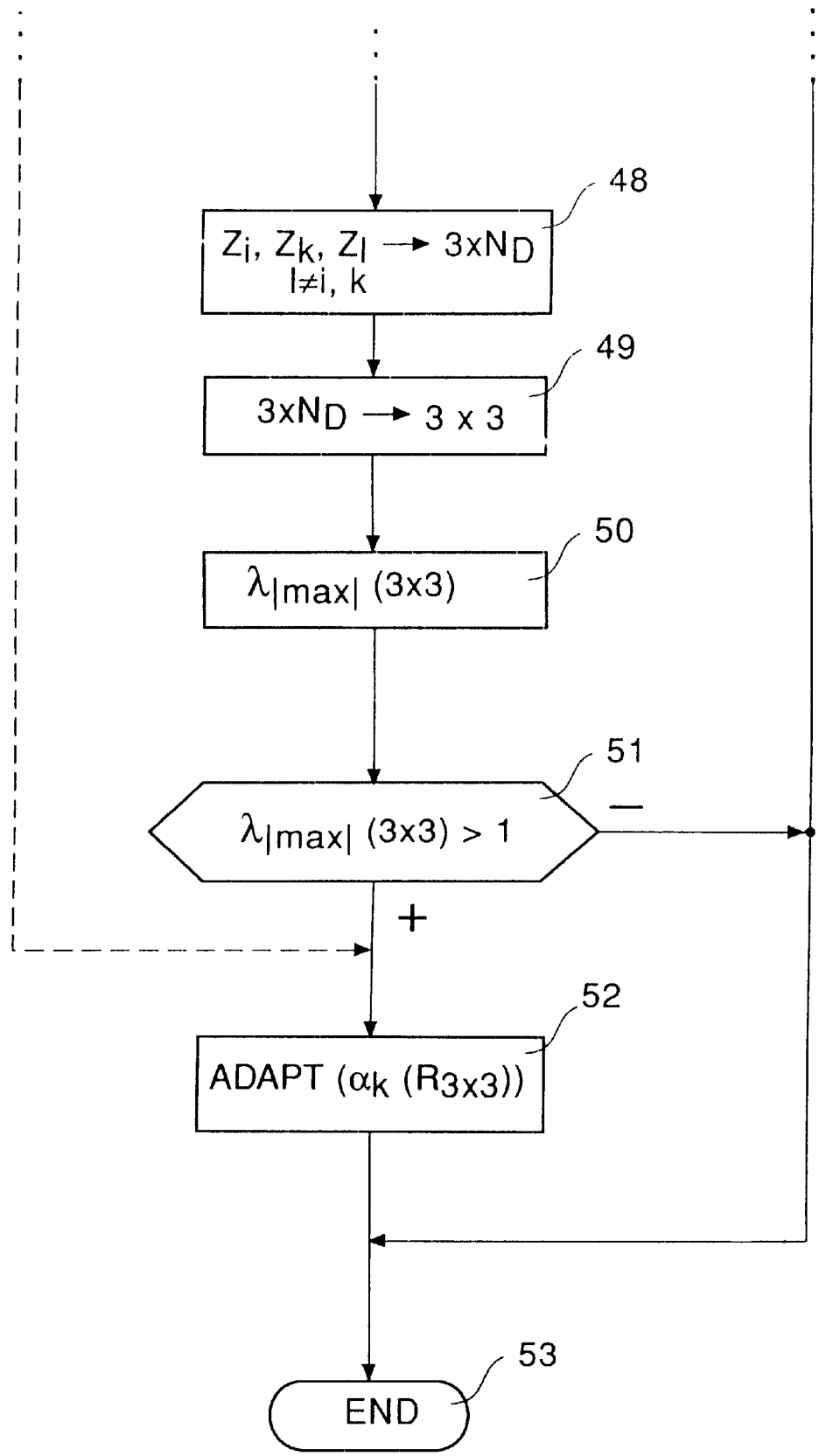
FIG. 5 shows a flowchart for a method for convergence checking.
Figure 1:
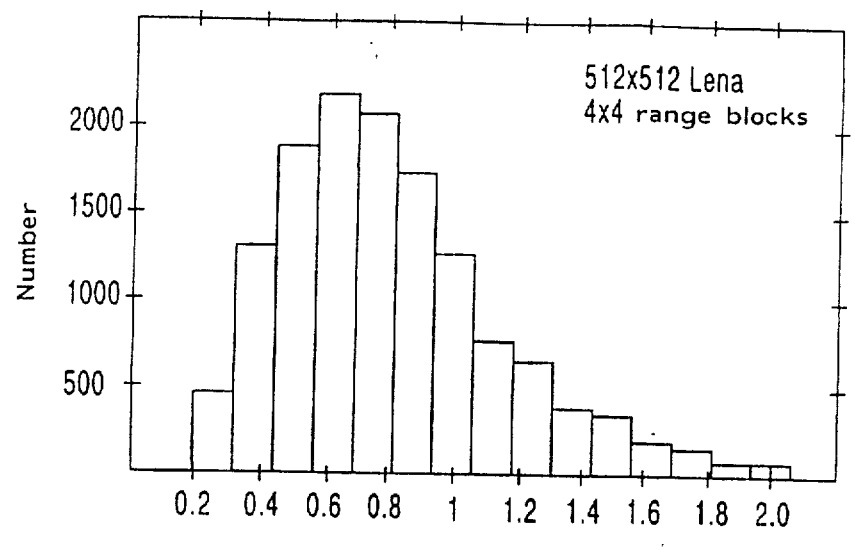
Figure 2:
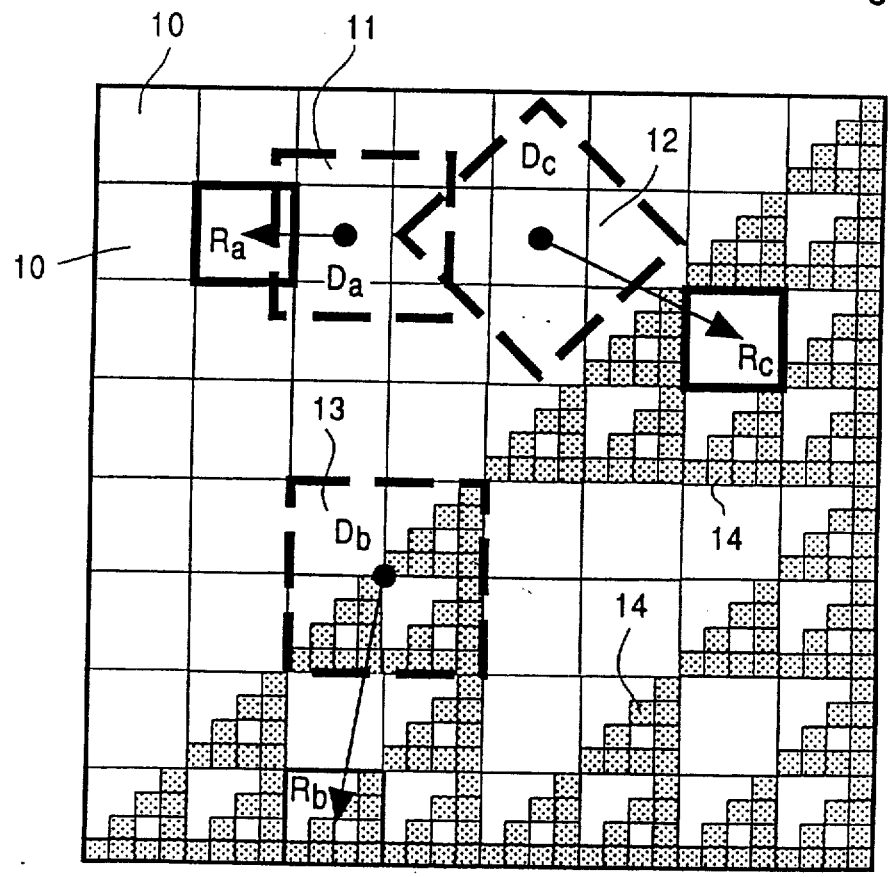
Figure 4:
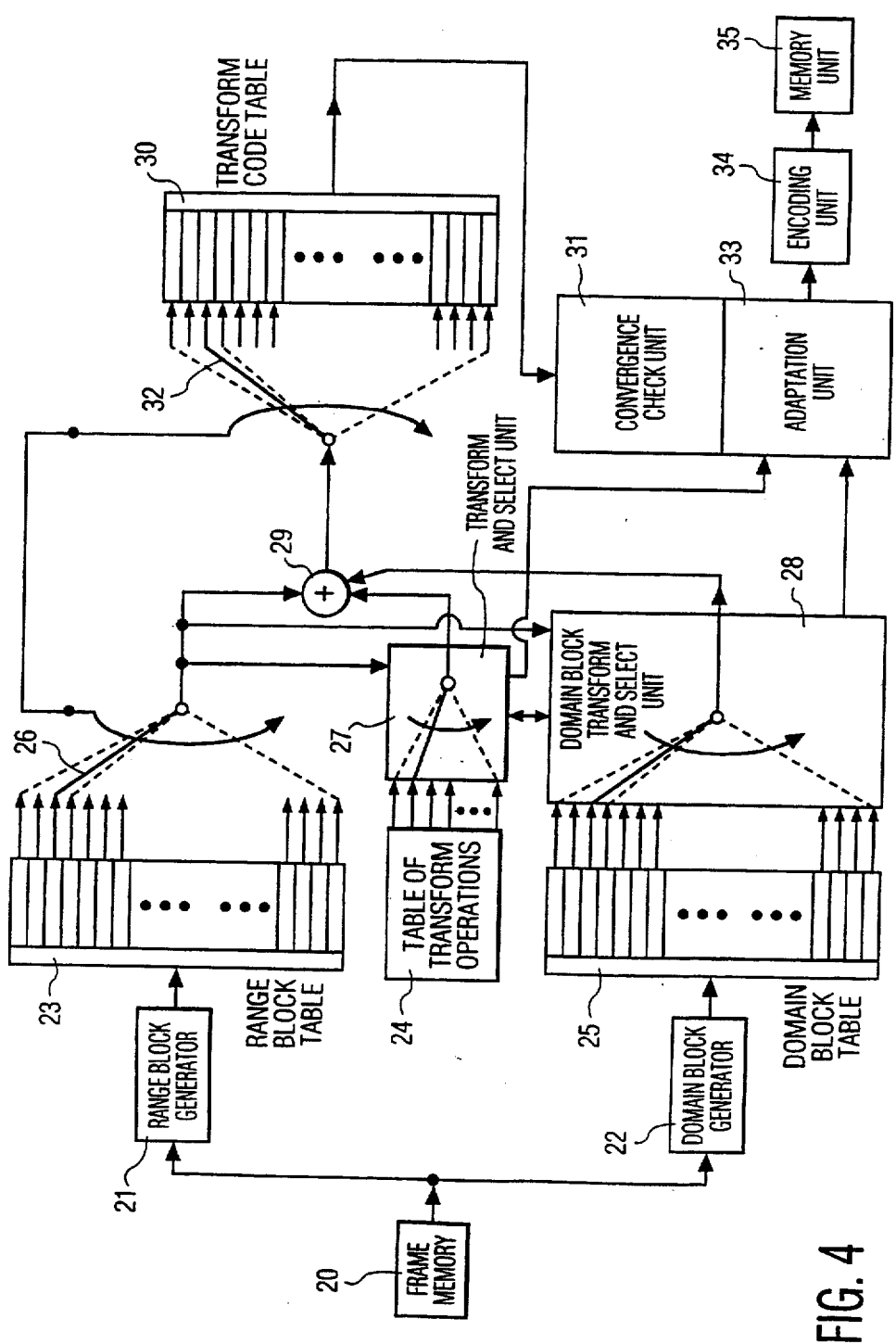
Figure 5:
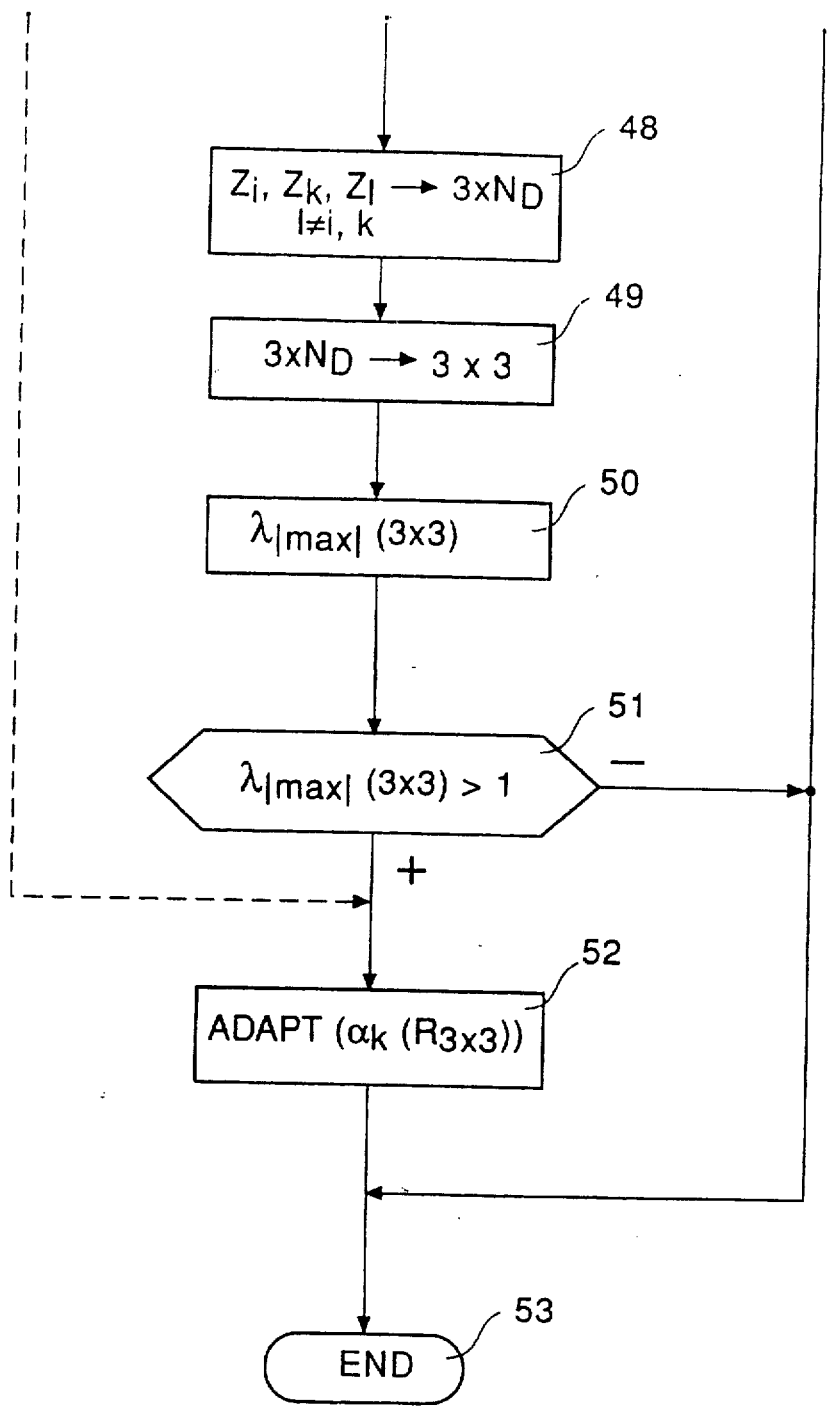

In FIG. 5, the dashed arrows indicate that even as early as after the interrogation steps 43 and 47, it is possible to go over to the adjustment step 52 if there is less outlay on computation available for convergence checking. However, it remains to be borne in mind that estimating the largest eigenvalues is relatively accurate only if, for example, the 3×3 matrices have been checked. If the determination of the largest eigenvalue of the reduced matrix is to be carried out yet more precisely, it is also possible according to the same scheme for the associated 4×4 matrices to be set up or matrices of even higher dimension. Of course, this is accompanied by a substantial increase in the outlay on computation for determining the eigenvalues.

As an alternative to checking the row sum norm, it would also be possible, for example, to check the column sum norm. This is also still within the scope of protection of the invention.

The convergence checking method described can also be used, for example, in a decoding device. In this case, convergence checking would also be carried out, for example, for the purpose of error detection. If the fractal code transmitted can be used to detect directly that no convergence occurs here, the decoding device can then carry out an appropriate error reaction such as, for example, once again representing the frequently represented image, or else outputting an error message.

Possible applications of the invention are, for example, to be seen in the field of the videophone, the digital video recorder, the digital camcorder, the digital video disc, etc.

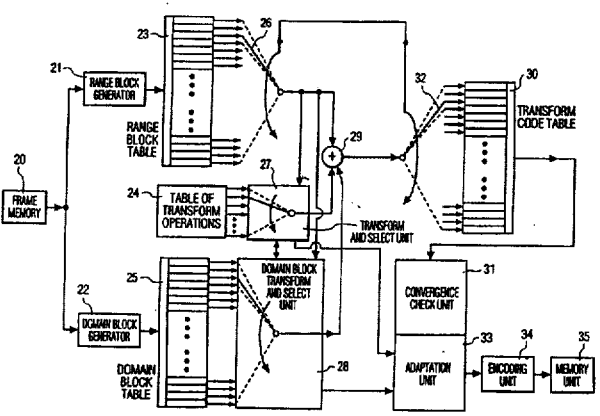

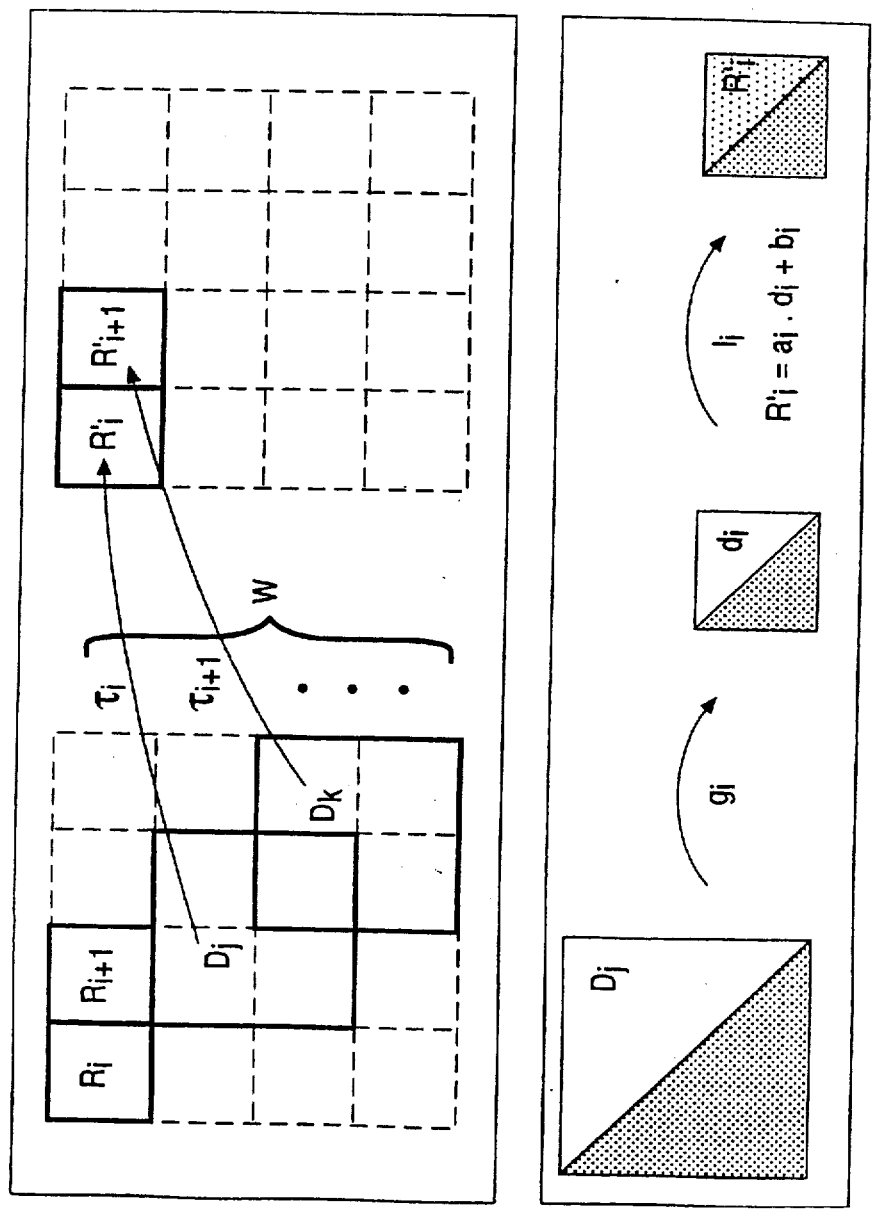

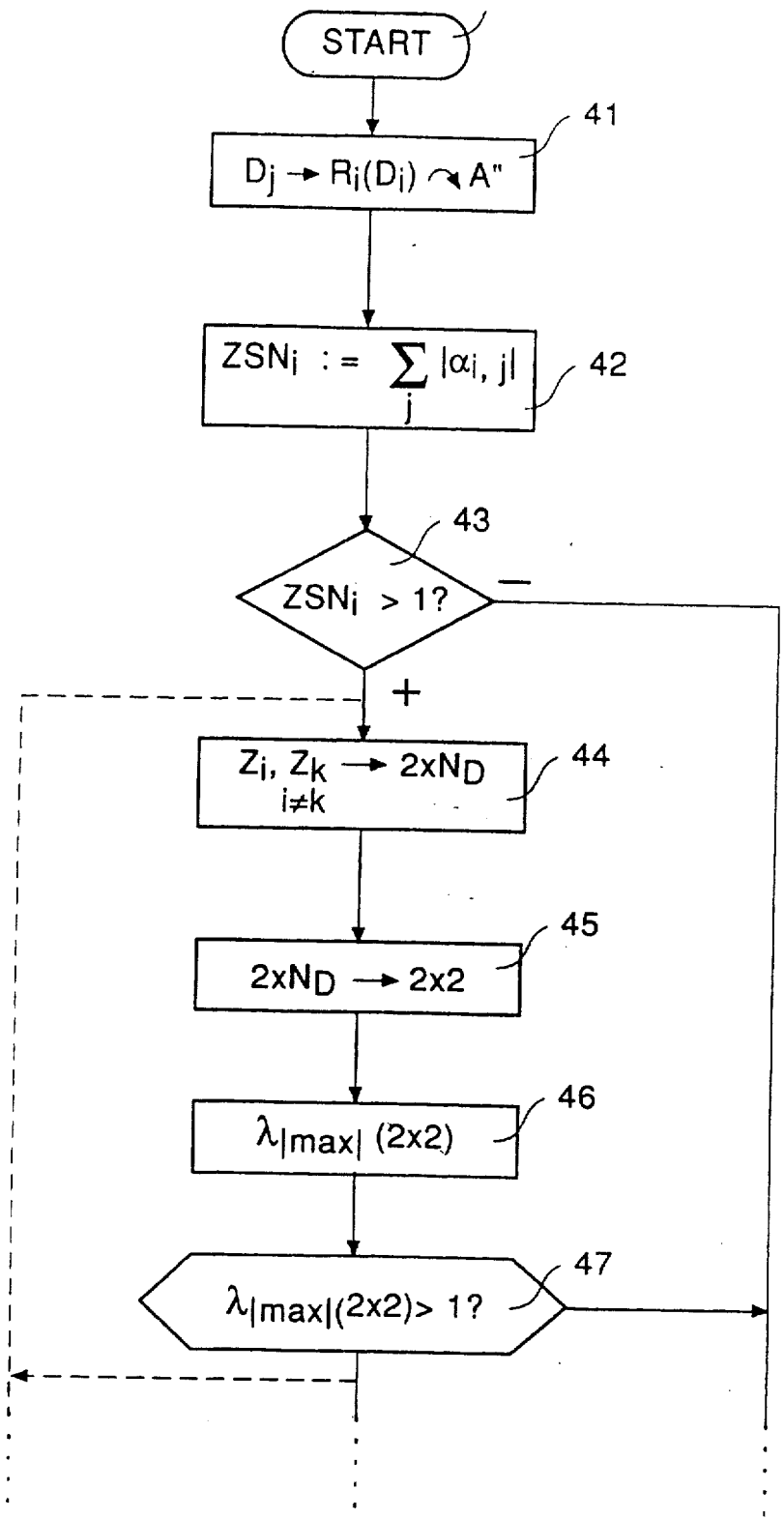

What is claimed is:

1. A method for checking convergence in fractal image coding, in which a digitized image is divided into a number of range blocks ($R_i$) and into a number of domain blocks ($D_j$), a similar domain block ($D_j$) being determined in relation to each range block ($R_i$), a transformation of a domain block ($D_j$) being undertaken at least in part in order to map a domain block ($D_j$) onto a range block ($R'_i$), the assignment of domain block to range block including the transformation parameters representing the fractal code, a reduced transformation matrix being set up for the purpose of checking the convergence of the fractal code, wherein checking the convergence of the fractal code comprises approximately determining the largest absolute eigenvalue of the reduced transformation matrix by checking the row sum norm ($ZSN_i$) of the rows of the reduced transformation matrix.

2. Method according to claim 1, it being the case that it is used in a device for fractal image coding.

3. Method according to claim 1, it being the case that it is used in a device for decoding a fractal code for an image.

4. A method for checking convergence in fractal image coding, in which a digitized image is divided into a number of range blocks ($R_i$) and into a number of domain blocks ($D_j$), a similar domain block ($D_j$) being determined in relation to each range block ($R_i$), a transformation of a domain block ($D_j$) being undertaken at least in part in order to map a domain block ($D_j$) onto a range block ($R'_i$), the assignment of domain block to range block including the transformation parameters representing the fractal code, a reduced transformation matrix being set up for the purpose of checking the convergence of the fractal code, said method comprising the steps of:

determining the row sum norm ($ZSN_i$) of the rows of the reduced transformation matrix and comparing with a predetermined value for approximately determining the largest absolute eigenvalue of the reduced transformation matrix; and when said row sum norm of a given row is larger than said predetermined value, combining said given row with the remaining rows of the reduced transformation matrix to form a $2 \times N_D$ matrix, $N_D$ specifying the number of the domain blocks, transforming the $2 \times N_D$ matrix into a $2 \times 2$ matrix by selecting those columns which correspond to the row numbers of the reduced transformation matrix which are selected for the $2 \times N_D$ matrix, adding the sum of the absolute values of the deleted elements of a row to the main diagonal element which belongs to the row when this main diagonal element is greater than zero, subtracting the sum of the absolute values of the deleted elements of a row from the main diagonal element when this main diagonal element is smaller than zero, and determining at least the largest absolute eigenvalue of the $2 \times 2$ matrix.

5. The method according to claim 4, wherein the largest absolute eigenvalue of the $2 \times 2$ matrix is determined by means of the von Mises method.

6. The method according to claim 4, wherein when the absolute value of the largest absolute eigenvalue of a $2 \times 2$ matrix is larger than the predetermined value, said method further comprises the steps of setting up all associated $3 \times 3$ matrices, the $3 \times 3$ matrices being produced by combining the rows of reduced transformation matrix which produce the $2 \times N_D$ matrix with each of the remaining rows of the reduced transformation matrix to form $3 \times N_D$ matrices and are transformed into a $3 \times 3$ matrix by omitting the column elements which do not correspond to the participating rows, it being the case that the sum of the absolute values of the non-adopted column elements of a row is in each case again added to the main diagonal element of the corresponding row when the main diagonal element is greater than or equal to zero, and is subtracted from the main diagonal element when the main diagonal element is smaller than zero, and determining at least the largest absolute eigenvalue of the respective $3 \times 3$ matrix.

7. The method according to claim 6, wherein when the absolute value of the largest absolute eigenvalue of a $3 \times 3$ matrix is larger than a predetermined value, said method further comprises the steps of setting up associated square matrices of next higher dimension in a corresponding way, and checking the largest absolute eigenvalue of said associated square matrices.

8. The method according to claim 6, wherein when the largest absolute eigenvalue of the $3 \times 3$ matrix is larger than a predetermined value, said method further comprises the step of adjusting the transformation parameters of the range blocks participating in the $3 \times 3$ matrix to depress the largest absolute eigenvalue below the predetermined value.

9. The method according to claim 4, wherein when the largest absolute eigenvalue of the $2 \times 2$ matrix is larger than a predetermined value, said method further comprises the step of adjusting the transformation parameters ($a_1$) of the range blocks participating in the $2 \times 2$ matrix to depress the largest absolute eigenvalue below the predetermined value.

10. A method for checking convergence in fractal image coding, in which a digitized image is divided into a number of range blocks ($R_i$) and into a number of domain blocks ($D_j$), a similar domain block ($D_j$) being determined in relation to each range block ($R_i$), a transformation of a domain block ($D_j$) being undertaken at least in part in order to map a domain block ($D_j$) onto a range block ($R'_i$), the assignment of domain block to range block including the transformation parameters representing the fractal code, a reduced transformation matrix being set up for the purpose of checking the convergence of the fractal code, said method comprising the steps of:

determining the row sum norm ($ZSN_i$) of the rows of the reduced transformation matrix and comparing with a predetermined value for approximately determining the largest absolute eigenvalue of the reduced transformation matrix, wherein when the row sum norm of a row of the reduced transformation matrix is greater than a predetermined value, the transformation parameters for the participating range blocks are adjusted to depress the row sum norm below the predetermined value.

11. A method for checking convergence in fractal image coding, in which a digitized image is divided into a number of range blocks ($R_i$) and into a number of domain blocks ($D_j$), a similar domain block ($D_j$) being determined in relation to each range block ($R_i$), a transformation of a domain block ($D_j$) being undertaken at least in part in order to map a domain block ($D_j$) onto a range block ($R'_i$), the assignment of domain block to range block including the transformation parameters representing the fractal code, a reduced transformation matrix being set up for the purpose of checking the convergence of the fractal code, said method comprising the steps of:

determining the row sum norm ($ZSN_i$) of the rows of the reduced transformation matrix and comparing with a predetermined value for approximately determining the largest absolute eigenvalue of the reduced transformation matrix, it being the case that, when it is established that one of a predetermined convergence criteria is not fulfilled, a new assignment of domain blocks ($D_j$) is made at least for the participating range blocks ($R_i$) and new associated transformation parameters are determined to depress the largest absolute eigenvalue of the reduced transformation matrix below the predetermined value.

* * * * *

UNITED STATES PATENT AND TRADEMARK OFFICE
CERTIFICATE OF CORRECTION

PATENT NO. : 5,978,516

DATED : November 2, 1999

INVENTOR(S) : Gerhard Dickopp, et al.

It is certified that error appears in the above-identified patent and that said Letters Patent is hereby corrected as shown below:

In the drawings, substitute drawing sheets 1-5 with attached drawing sheets.

Title page, showing the illustrative figure, should be deleted to appear as per attached title page.

Signed and Sealed this

Second Day of January, 2001

Attest:

Attesting Officer

Q. TODD DICKINSON

Commissioner of Patents and Trademarks

United States Patent
Dickopp et al.

[11] Patent Number: 5,978,516
[45] Date of Patent: Nov. 2, 1999

[54] METHOD FOR CHECKING CONVERGENCE IN FRACTAL IMAGE CODING

[75] Inventors: Gerhard Dickopp, Krefeld; Peter Siepen, Oberhausen, both of Germany

[73] Assignee: Deutsche Thomson-Brandt GmbH. Villingen-Schwenningen, Germany

[21] Appl. No.: 08/938,090

[22] Filed: Sep. 26, 1997

[30] Foreign Application Priority Data

Oct. 7, 1996 [DE] Germany ............... 196 41 157

[51] Int. Cl.$^6$ .................. G06K 9/36; G06K 9/46
[52] U.S. Cl. ........................................ 382/249
[58] Field of Search ................. 341/51; 345/436; 348/384, 390, 403, 404, 420; 358/426, 430, 432, 433; 382/232, 248, 249, 276

[56] References Cited

FOREIGN PATENT DOCUMENTS

WO 95 08161  A1  3/1995  WIPO.

OTHER PUBLICATIONS

Saupe et al., "Complexity Reduction Methods for Fractal Image Compression", Sep. 1994, pp. 1–20, Image Processing: Mathematical and Applications.

Siepen et al., "The Question of Convergence in Fractal Image Coding", Oct. 1998, pp. 133–138, Proceedings of the 6th Dortmund Television Seminar.

Beaumont, "Advances in block based fractal coding of still pictures", pp. 3/1–3/6, IEE Colloquium.

Jacquin, "Image coding based on a fractal theory of iterated contractive image transformations", Jan. 1992, pp. 18–30, IEEE Transactions on Image Processing.

Fisher, "Fractal Image Conpression", 1994, pp. 11–14, 50–52, 59, 61, and 145–148.

Fischer, Yuval: Fractal Image Compression. Springer–Verlag, New York, Berlin, 1994. S.48–53. S. 214–228.

Jacquin, Arnaud E.: Fractal Image Coding: A Review In: Proceedings of the IEEE, vol. 81, No. 10, Oct. 1993, S. 1451–1465.

Jaggard, Dwight L.: Special Section on Fractals in Electrical Engineering. In: Proceedings of the IEE, vol. 81, No. 10, Oct. 1993, S. 1423–S1427.

Hurtgen, B.: Contractivity of fractaltransforms for image coding. In: Electronics Letters, 30. Sep. 1993, vol. 29, No. 20, S. 1749, 1750.

*Primary Examiner*—Amelia Au
*Assistant Examiner*—Timothy M. Johnson
*Attorney, Agent, or Firm*—Joseph S. Tripoli; Eric P. Herrmann; Alexander J. Burke

[57] ABSTRACT

A method is proposed for checking convergence in fractal image coding. In this case, a digitized image is divided into a number of range blocks ($R_i$, $R_{i+1}$) and into a number of domain blocks ($D_j$, $D_k$). A similar domain block is determined in relation to each range block. If necessary, in this process a transformation of a domain block is undertaken in order to map the domain block onto a range block. The assignment of the domain block to the range block including the transformation parameters represents the fractal code for the image. A reduced transformation matrix is set up to check convergence of the fractal code. The largest absolute eigenvalue of the transformation matrix is determined approximately. The entire method can be carried out in this case hierarchically. In a first approximation step, at least the row sum norm of each row of the reduced transformation matrix is checked. In further steps, further rows are combined to form square matrices of higher dimension. The latter are used to determine the largest absolute eigenvalues for the purpose of checking convergence.

11 Claims, 5 Drawing Sheets